US012157780B2

(12) United States Patent
White et al.

(10) Patent No.: US 12,157,780 B2
(45) Date of Patent: Dec. 3, 2024

(54) PROCESSES FOR REMOVING COLOR BODIES FROM GUAYULE

(71) Applicant: Bridgestone Corporation, Chuo-ku (JP)

(72) Inventors: Robert W. White, Gilbert, AZ (US); Michael R. Hartzell, Gold Canyon, AZ (US)

(73) Assignee: Bridgestone Corporation, Chuo-ku (JP)

(*) Notice: Subject to any disclaimer, the term of this patent is extended or adjusted under 35 U.S.C. 154(b) by 745 days.

(21) Appl. No.: 17/415,576

(22) PCT Filed: Dec. 19, 2019

(86) PCT No.: PCT/US2019/067514
§ 371 (c)(1),
(2) Date: Jun. 17, 2021

(87) PCT Pub. No.: WO2020/132264
PCT Pub. Date: Jun. 25, 2020

(65) Prior Publication Data
US 2022/0056160 A1 Feb. 24, 2022

Related U.S. Application Data

(60) Provisional application No. 62/783,226, filed on Dec. 21, 2018.

(51) Int. Cl.
C08C 1/04 (2006.01)
B01J 20/20 (2006.01)
C08C 2/02 (2006.01)
C08C 3/02 (2006.01)
C08C 1/02 (2006.01)

(52) U.S. Cl.
CPC .............. C08C 1/04 (2013.01); B01J 20/20 (2013.01); C08C 2/02 (2013.01); C08C 3/02 (2013.01); C08C 1/02 (2013.01)

(58) Field of Classification Search
CPC .... C08C 1/02; C08C 1/04; C08C 2/02; C08C 3/02; B01J 20/20

USPC ........................................................ 523/210
See application file for complete search history.

(56) References Cited

U.S. PATENT DOCUMENTS

| | | |
|---|---|---|
| 2,148,832 A | 2/1939 | Reynolds |
| 2,549,763 A | 4/1951 | Banijan, Jr. et al. |
| 2,744,125 A * | 5/1956 | Meeks ................ C11C 1/025 554/208 |
| 2,888,498 A | 5/1959 | Carroll et al. |
| 4,412,031 A | 10/1983 | Kitahara et al. |
| 4,435,337 A * | 3/1984 | Kay .................... C08J 11/06 554/23 |
| 4,568,711 A | 2/1986 | Kay et al. |
| 4,591,631 A | 5/1986 | Beattie et al. |
| 4,616,068 A | 10/1986 | Schloman et al. |
| 4,684,715 A | 8/1987 | Kay et al. |
| 4,804,741 A | 2/1989 | Verbiscar et al. |
| 2015/0018459 A1* | 1/2015 | Huang ................ C08C 2/02 524/13 |
| 2017/0146291 A1* | 5/2017 | Huang ................ C08C 4/00 |
| 2018/0371112 A1* | 12/2018 | Querci ............... C08J 99/00 |

FOREIGN PATENT DOCUMENTS

| | | |
|---|---|---|
| CN | 103483656 A | 1/2014 |
| CN | 103613815 A | 3/2014 |
| CN | 104479188 A | 4/2015 |
| EP | 0087109 A1 | 8/1983 |
| EP | 0164137 A2 | 12/1985 |
| GB | 267808 A | 3/1997 |
| WO | 2017/103775 A1 | 6/2017 |

OTHER PUBLICATIONS

International Preliminary Report on Patentability and Written Opinion from PCT application No. PCT/US2019/067514, dated Jun. 16, 2021, 6 pages.
International search report from PCT application No. PCT/US2019/067514, dated Apr. 22, 2020, 5 pages.

* cited by examiner

Primary Examiner — Ruiyun Zhang
(74) Attorney, Agent, or Firm — Meredith E. Hooker; Jenny L. Sheaffer

(57) ABSTRACT

Disclosed herein are process for removing color bodies from an organic solution comprising guayule resin. The processes include the use of activated carbon.

20 Claims, No Drawings

PROCESSES FOR REMOVING COLOR BODIES FROM GUAYULE

This application is a national stage application of PCT/US2019/067514 filed on Dec. 19, 2019, which claims the benefit of U.S. Provisional Application Ser. No. 62/783,226 filed on Dec. 21, 2018, which are incorporated herein by reference in their entirety.

FIELD

The present application is directed to processes for removing color bodies from organic solutions which include components from the guayule shrub.

BACKGROUND

The guayule shrub provides a source of natural rubber. Process for extracting the natural rubber from their location within the cell walls of the guayule shrub may involve the use of one or more organic solvents. Along with the natural rubber certain color bodies may be co-extracted.

SUMMARY

Disclosed herein are processes for removing color bodies from organic solutions which include components from the guayule shrub.

In a first embodiment, a process is disclosed for removing color bodies from an organic solution comprising guayule resin. According to the first embodiment, the process comprises (a) providing an organic solvent-guayule resin stream comprising (i) at least 0.3 weight % guayule resin based upon the total weight of the organic solvent-guayule resin stream, and (ii) polar organic solvent in an amount of about 15 to about 80 weight % based upon the total weight of the organic solvent-guayule resin stream; (b) contacting a first quantity of the organic solvent-guayule resin stream of (a) with activated carbon and producing a purified organic solvent-guayule resin solution and spent activated carbon; (c) isolating the spent activated carbon from the purified organic solvent-guayule resin solution of (b); and (d) contacting the isolated spent activated carbon from (c) with a regenerating solution comprising about 20 to about 50% by weight polar organic solvent based upon the total weight of the regenerating solution, and about 50 to about 80% by weight non-polar organic solvent based upon the total weight of the regenerating solution, thereby producing regenerated activated carbon.

In a second embodiment, a process is disclosed for removing color bodies from an organic solution comprising guayule resin. According to the second embodiment, the process comprises (a) providing an organic solvent-guayule resin stream comprising (i) at least 0.3 weight % guayule resin based upon the total weight of the organic solvent-guayule resin stream, (ii) polar organic solvent in an amount of about 45 to about 80 weight % based upon the total weight of the organic solvent-guayule resin stream, and (iii) no more than 1 weight % guayule rubber based upon the total weight of the organic solvent-guayule resin stream; (b) contacting a first quantity of the organic solvent-guayule resin stream of (a) with activated carbon and producing a purified organic solvent-guayule resin solution and spent activated carbon; (c) isolating the spent activated carbon from the purified organic solvent-guayule resin solution of (b); and (d) contacting the isolated spent activated carbon from (c) with a regenerating solution comprising about 20 to about 50% by weight polar organic solvent based upon the total weight of the regenerating solution, and about 50 to about 80% by weight non-polar organic solvent based upon the total weight of the regenerating solution, thereby producing regenerated activated carbon.

In a third embodiment, a process is disclosed for removing color bodies from an organic solution comprising guayule resin. According to the third embodiment, the process comprises (a) providing an organic solvent-guayule resin stream comprising (i) at least 0.3 weight % guayule resin based upon the total weight of the organic solvent-guayule resin stream, and (ii) polar organic solvent in an amount of about 15 to about 80 weight % based upon the total weight of the organic solvent-guayule resin stream; (b) contacting a first quantity of the organic solvent-guayule resin stream of (a) with activated carbon and producing a purified organic solvent-guayule resin solution and spent activated carbon; and (c) isolating the spent activated carbon from the purified organic solvent-guayule resin solution of (b).

DETAILED DESCRIPTION

Disclosed herein are processes for removing color bodies from organic solutions which include components from the guayule shrub.

In a first embodiment, a process is disclosed for removing color bodies from an organic solution comprising guayule resin. According to the first embodiment, the process comprises (a) providing an organic solvent-guayule resin stream comprising (i) at least 0.3 weight % guayule resin based upon the total weight of the organic solvent-guayule resin stream, and (ii) polar organic solvent in an amount of about 15 to about 80 weight % based upon the total weight of the organic solvent-guayule resin stream; (b) contacting a first quantity of the organic solvent-guayule resin stream of (a) with activated carbon and producing a purified organic solvent-guayule resin solution and spent activated carbon; (c) isolating the spent activated carbon from the purified organic solvent-guayule resin solution of (b); and (d) contacting the isolated spent activated carbon from (c) with a regenerating solution comprising about 20 to about 50% by weight polar organic solvent based upon the total weight of the regenerating solution, and about 50 to about 80% by weight non-polar organic solvent based upon the total weight of the regenerating solution, thereby producing regenerated activated carbon.

In a second embodiment, a process is disclosed for removing color bodies from an organic solution comprising guayule resin. According to the second embodiment, the process comprises (a) providing an organic solvent-guayule resin stream comprising (i) at least 0.3 weight % guayule resin based upon the total weight of the organic solvent-guayule resin stream, (ii) polar organic solvent in an amount of about 45 to about 80 weight % based upon the total weight of the organic solvent-guayule resin stream, and (iii) no more than 1 weight % guayule rubber based upon the total weight of the organic solvent-guayule resin stream; (b) contacting a first quantity of the organic solvent-guayule resin stream of (a) with activated carbon and producing a purified organic solvent-guayule resin solution and spent activated carbon; (c) isolating the spent activated carbon from the purified organic solvent-guayule resin solution of (b); and (d) contacting the isolated spent activated carbon from (c) with a regenerating solution comprising about 20 to about 50% by weight polar organic solvent based upon the total weight of the regenerating solution, and about 50 to about 80% by weight non-polar organic solvent based upon the total weight of the regenerating solution, thereby producing regenerated activated carbon.

In a third embodiment, a process is disclosed for removing color bodies from an organic solution comprising guayule resin. According to the third embodiment, the process comprises (a) providing an organic solvent-guayule resin stream comprising (i) at least 0.3 weight % guayule resin based upon the total weight of the organic solvent-guayule resin stream, and (ii) polar organic solvent in an amount of about 15 to about 80 weight % based upon the total weight of the organic solvent-guayule resin stream; (b) contacting a first quantity of the organic solvent-guayule resin stream of (a) with activated carbon and producing a purified organic solvent-guayule resin solution and spent activated carbon; and (c) isolating the spent activated carbon from the purified organic solvent-guayule resin solution of (b).

Definitions

The terminology as set forth herein is for description of the embodiments only and should not be construed as limiting the invention as a whole.

As used herein, the phrase guayule natural rubber refers to rubber from the guayule shrub or *Parthenium argentatum*.

As used herein, the term "color bodies" refers to moieties present in the organic solvent-guayule resin stream which impart color (e.g., a green color) to the stream. Generally, these color bodies will be present from the guayule plant material. Non-limiting examples of such color bodies are chlorophyll, lignins, suberins, and tannins.

As used herein, the term "majority" refers to more than 50% (e.g., 51% or more).

Organic Solvent-Guayule Resin Stream

As discussed above, each of the processes of the first-third embodiments includes providing an organic solvent-guayule resin stream which is subsequently contacted with activated carbon. According to certain preferred embodiments of the first-third embodiments, the organic solvent-guayule resin stream may be obtained as part of a larger process of extracting useful products (e.g., rubber and/or resin) from guayule shrub material using organic solvents. In other embodiments of the first-third embodiments, the organic solvent-guayule resin stream may be obtained by or from other processes.

By referring to the stream of the first-third embodiments as an organic solvent-guayule resin stream is meant that the stream includes at least an organic solvent component and a guayule component. As discussed in more detail below, according to certain embodiments of the first-third embodiments, the organic solvent-guayule resin stream may include additional components (e.g., guayule rubber). Generally, according to the first-third embodiments, the organic solvent component includes a polar organic solvent and optionally may also include a non-polar organic solvent. According to the first-third embodiments, the organic solvent-guayule resin stream can also be understood as including (containing) color bodies which are components which contribute to the color of the organic solvent-guayule resin stream.

As mentioned above, according to the first-third embodiments, the organic solvent-guayule resin stream includes (comprises) at least 0.3 weight % guayule resin (e.g., 0.3 weight %, 0.4 weight %, 0.5 weight %, 0.6 weight %, 0.7 weight %, 0.8 weight %, 0.9 weight %, 1 weight %, 2 weight %, 3 weight %, 4 weight %, 5 weight %, 6 weight %, 7 weight %, 8 weight %, 9 weight %, 10 weight %, or more guayule resin) based upon the total weight of the organic solvent-guayule resin stream. In certain embodiments of the first-third embodiments, the organic solvent-guayule resin stream includes (comprises) 1 weight % to 10 weight %, preferably 0.3 weight % to 7 weight % guayule resin, or 1 weight % to 5 weight % guayule resin, based upon the total weight of the organic solvent-guayule resin stream. Generally, according to the first-third embodiments, the guayule resin present in the organic solvent-guayule resin stream will be solubilized in the organic solvent(s) of the solution. By solubilized is meant that a sample of the organic solvent-guayule resin stream filtered through a 50 mesh filter does not filter out any guayule resin.

As also mentioned above, according to the first and third embodiments, the organic solvent-guayule resin stream also includes or comprises (in addition to the guayule resin in an amount as discussed above) polar organic solvent in an amount of about 15 to about 80 weight % based upon the total weight of the organic solvent-guayule resin stream. In certain embodiments of the first and third embodiments, the organic solvent-guayule resin stream includes 15 to 80 weight % (e.g., 15, 16, 17, 18, 19, 20, 21, 22, 23, 24, 25 30, 35, 40, 45, 50, 55, 60, 61, 62, 63, 64, or 65 weight %) polar organic solvent, 15 to 65 weight % (e.g., 15, 20, 25, 30, 35, 40, 45, 50, 55, 60, or 65 weight %), 15 to 55 weight % (e.g., 15, 16, 17, 18, 19, 20, 21, 22, 23, 24, 25, 30, 35, 40, 45, 50, or 55 weight %), 20 to 80 weight % (e.g., 20, 25, 30, 35, 40, 45, 50, 55, 60, 65, 70, 75, or 80 weight %), 30 to 80 weight % (e.g., 30, 35, 40, 45, 50, 55, 60, 65, 70, 75, or 80 weight %), 45 to 80 weight % (e.g., 45, 50, 55, 60, 65, 70, 75, or 80 weight %) polar organic solvent. Generally, according to the first and third embodiments, when the amount of guayule rubber present in the organic solvent-guayule resin stream is relatively lower (e.g., less than 1 weight % or about 0.5 to about 0.1 weight %), it may be possible to have a relatively higher amount of polar organic solvent present such as 50 to 80 weight % (e.g., 50%, 55%, 60%, 65%, 70%, 75%, 80%) without causing the guayule rubber to undesirably precipitate or coagulate.

As also mentioned above, according to the second embodiment, the organic solvent-guayule resin stream also includes or comprises (in addition to the guayule resin in an amount as discussed above) polar organic solvent in an amount of about 45 to about 80 weight % based upon the total weight of the organic solvent-guayule resin stream. In certain embodiments of the second embodiment, the organic solvent-guayule resin stream includes 50 to 80 weight % (e.g., 50, 52, 54, 56, 58, 60, 62, 64, 66, 68, 70, 72, 74, 76, 78, or 80 weight %) polar organic solvent, 50 to 70 weight % (e.g., 50, 52, 54, 56, 58, 60, 62, 64, 66, 68, or 70 weight %) polar organic solvent, 60 to 80 weight % (e.g., 60, 62, 64, 66, 68, 70, 72, 74, 76, 78, or 80 weight %) polar organic solvent, or 60 to 70 weight % (e.g., 60, 62, 64, 66, 68, or 70 weight %) polar organic solvent. In certain preferred embodiments of the second embodiment, the amount of polar organic solvent present in the organic solvent-guayule resin stream is larger than the amount of non-polar organic solvent present in the organic solvent-guayule resin stream.

According to the first-third embodiments, one or more than one polar organic solvent may be present in the organic solvent-guayule resin stream. When more than one polar organic solvent is present in the organic solvent-guayule resin stream, the foregoing amounts should be understood as referring to the total amount of all polar organic solvents based upon the total weight of the organic solvent-guayule resin stream. According to the first-third embodiments, the polar organic solvent or solvents present in the organic solvent-guayule resin stream may vary, as discussed in more detail below.

As mentioned above, according to the second embodiment, the organic solvent-guayule resin stream includes (comprises) a limited amount of guayule rubber, more specifically no more than 1 weight % guayule rubber based upon the total weight of the organic solvent-guayule resin stream. In certain embodiments of the second embodiment, the organic solvent-guayule resin stream includes (comprises) no more than 0.5 weight % (e.g., 0.5, 0.4, 0.3, 0.2, 0.1 weight % or less) guayule rubber, or no more than 0.1 weight % guayule rubber based upon the total weight of the organic solvent-guayule resin stream.

In certain embodiments of the first and third embodiments, the organic solvent-guayule resin stream also includes or comprises (in addition to the guayule resin and polar organic solvent of the organic solvent component) guayule rubber, in an amount of up to 7 weight % based upon the total weight of the organic solvent-guayule resin stream. In certain embodiments of the first and third embodiments, the organic solvent-guayule resin stream includes (comprises) 0.1 to 7 weight % (e.g., 0.1, 0.5, 0.6, 0.7, 0.8, 0.9, 1, 1.5, 2, 2.5, 3, 3.5, 4, 4.5, 5, 5.5, 6, 6.5 or 7 weight %) guayule rubber, 0.5 to 6 weight % (e.g., 0.5, 0.6, 0.7, 0.8, 0.9, 1, 1.5, 2, 2.5, 3, 3.5, 4, 4.5, 5, 5.5, or 6 weight %) guayule rubber, 0.5 to 5 weight % (e.g., 0.5, 0.6, 0.7, 0.8, 0.9, 1, 1.5, 2, 2.5, 3, 3.5, 4, 4.5, or 5 weight %) guayule rubber, 0.5 to 4 weight % (e.g., 0.5, 0.6, 0.7, 0.8, 0.9, 1, 1.5, 2, 2.5, 3, 3.5, or 4 weight %) guayule rubber, 0.5 to 3 weight % (e.g., 0.5, 0.6, 0.7, 0.8, 0.9, 1, 1.5, 2, 2.5, or 3 weight %) guayule rubber, 0.5 to 2 weight % (e.g., 0.5, 0.6, 0.7, 0.8, 0.9, 1, 1.5, or 2 weight %) guayule rubber, 0.5 to 1 weight % (e.g., 0.5, 0.6, 0.7, 0.8, 0.9, or 1 weight %) guayule rubber, 1 to 7 weight % (e.g., 1, 1.5, 2, 2.5, 3, 3.5, 4, 4.5, 5, 5.5, 6, 6.5 or 7 weight %) guayule rubber, 1 to 6 weight % (e.g., 1, 1.5, 2, 2.5, 3, 3.5, 4, 4.5, 5, 5.5, or 6 weight %) guayule rubber, 1 to 5 weight % (e.g., 1, 1.5, 2, 2.5, 3, 3.5, 4, 4.5, or 5 weight %) guayule rubber, 1 to 4 weight % (e.g., 1, 1.5, 2, 2.5, 3, 3.5, or 4 weight %) guayule rubber, 1 to 3 weight % (e.g., 1, 1.5, 2, 2.5, or 3 weight %) guayule rubber, or 1 to 2 weight % (e.g., 1, 1.5, or 2 weight %) guayule rubber, all based upon the total weight of the organic solvent-guayule resin stream.

Generally, according to the first-third embodiments, any guayule rubber present in the organic solvent-guayule resin stream will be solubilized in the organic solvent(s) of the solution. By solubilized is meant that a sample of the organic solvent-guayule resin stream filtered through a 50 mesh filter does not filter out any guayule rubber.

In certain preferred embodiments of the first-third embodiments, the organic solvent-guayule resin stream also includes or further comprises non-polar organic solvent. According to the first-third embodiments, the amount of non-polar organic solvent utilized may vary and one or more than one non-polar organic solvent may be utilized. Generally, according to the first and third embodiments, an amount of about 10 to about 85 weight % of non-polar organic solvent(s) may be utilized based upon the total weight of the organic solvent-guayule resin stream. In certain embodiments of the first and third embodiments, the organic solvent-guayule resin stream includes 35 to 85 weight % (e.g., 35, 36, 37, 38, 39, 40, 45, 50, 55, 60, 65, 70, 75, 80, 81, 82, 83, 84, or 85 weight %) non-polar organic solvent, 35 to 80 weight % (e.g., 35, 40, 45, 50, 55, 60, 65, 70, 75, or 80 weight %), 45 to 80 weight % (e.g., 45, 50, 55, 60, 65, 70, 75, or 80 weight %), 35 to 75 weight % (e.g., 35, 40, 45, 50, 55, 60, 65, 70 or 75 weight %), or 40 to 70 weight % (e.g., 40, 45, 50, 55, 60, 65 or 70 weight %) non-polar organic solvent. Generally, according to the second embodiment, an amount of about 10 to about 50 weight % of non-polar organic solvent(s) may be utilized based upon the total weight of the organic solvent-guayule resin stream. In certain embodiments of the second embodiment, the amount of non-polar organic solvent(s) is 10 to 45 weight %, 10 to 35 weight %, 10 to 25 weight %, 10 to 15 weight %, 20 to 45 weight %, or 20 to 35 weight % non-polar organic solvent(s) based upon the total weight of the organic solvent-guayule resin stream. In certain preferred embodiments of the second embodiment, the total amount of non-polar organic solvent(s) in the organic solvent-guayule resin stream is lower than the total amount of polar organic solvent(s) in the organic solvent-guayule resin stream.

According to the first-third embodiments, one or more than one non-polar organic solvent may be present in the organic solvent-guayule resin stream. When more than one non-polar organic solvent is present in the organic solvent-guayule resin stream, the foregoing amounts should be understood as referring to the total amount of all non-polar organic solvents based upon the total weight of the organic solvent-guayule resin stream. According to the first-third embodiments, the non-polar organic solvent or solvents present in the organic solvent-guayule resin stream may vary, as discussed in more detail below.

In certain preferred embodiments of the first-third embodiments, the amount of any water that is present in the organic solvent-guayule resin stream is limited to no more than 10 weight % (e.g., 10, 9.5, 9, 8.5, 8, 7.5, 7, 6.5, 6, 5.5, 5, 4.5, 4, 3.5, 3, 2.5, 2, 1.5, 1 weight % or less) based upon the total weight of the organic solvent-guayule resin stream. In certain embodiments of the first-third embodiment, the amount of any water that is present in the organic solvent-guayule resin stream is no more than 5 weight % (e.g., 5, 4, 3, 2, 1 weight % or less) based upon the total weight of the organic solvent-guayule resin stream or no more than 2 weight % (e.g., 2, 1.5, 1, 0.5, 0.4, 0.3, 0.2, 0.1 weight % or less).

Generally, according to the first-third embodiments, the amount of any non-rubber solid plant material that is present in the organic solvent-guayule resin stream is limited. By the phrase non-rubber solid plant material is meant fine particles of wood-like plant material from the guayule shrub, which can also be referred to as bagasse. The phrase is not meant to encompass color bodies, guayule rubber, or guayule resin. In certain embodiments of the first-third embodiments, the amount of any non-rubber and non-resin solid plant material that is present in the organic solvent-guayule resin stream is no more than 1.5 weight % based upon the total weight of the organic solvent-guayule resin stream. Such non-rubber solid plant will generally be very small in size, having an average particle size of 20 microns or less. In certain embodiments of the first-third embodiments, the amount of any non-rubber, non-resin guayule plant matter remaining in the organic solvent-guayule resin stream is less than 1.5 ash weight % (e.g., 1.5 ash weight %, 1.2 ash weight %, 1 ash weight %, 0.8 ash weight %, 0.6 ash weight %, 0.4 ash weight %, 0.2 ash weight %, 0.1 ash weight %, or less), preferably less than 0.4 ash weight %. The ash weight % in a sample of organic solvent-guayule resin stream can be determined by aching a sample in a muffle furnace. According to an exemplary procedure, a muffle furnace is preheated to 750° C., and a sample is then heated in a dry crucible at 750° C. for 4 hours total (1 hour covered, 3 hours uncovered). After cooling, the weight of the remaining material can be considered the ash weight.

Activated Carbon and Contacting with Activated Carbon

As discussed above, according to the first-third embodiments, the process includes contacting a first quantity of the organic solvent-guayule resin stream with activated carbon to produce a purified organic solvent-guayule resin solution and spent activated carbon. Generally, according to the first-third embodiments, contact of a first quantity of the organic solvent-guayule resin stream with activated carbon will remove color bodies from the organic solvent-guayule resin stream, thereby producing a purified organic solvent-guayule resin stream. Generally, according to the first-third embodiments, the purified organic solvent-guayule resin stream will differ in color from the organic solvent-guayule resin stream due to the removal of the color bodies. Generally, according to the processes of the first-third embodiments, the activated carbon can be understood to remove color bodies from the organic solvent-guayule resin stream by adsorption of the color bodies to the activated carbon. Thus, removal of color bodies from the organic solvent-guayule resin stream will generally result in an improvement in the color of the resulting purified organic solvent-guayule resin solution. In certain embodiments of the first-third embodiments, the process further comprises (also includes) contacting at least a second quantity (e.g., a second quantity, a second and a third quantity, a second and third and fourth quantity, etc.) of the organic solvent-guayule resin stream with activated carbon before producing activated carbon which can be considered to be spent. As used herein, the phrase spent activated carbon refers to a quantity of activated carbon which has adsorbed at least 80% (e.g., 80%, 85%, 90%, 95%, 98%, or more) of the amount (by weight) of color bodies that quantity of activated carbon is capable of adsorbing. According to the processes of the first-third embodiments, the contacting of the organic solvent-guayule resin stream with the activated carbon may be conducted via a batch process or via a continuous process. Preferably, the contacting is conducted via a continuous process. In certain embodiments of the processes of the first-third embodiments, the contacting of the organic solvent-guayule resin stream with the activated carbon is conducted via a continuous process and at least two separate quantities of activated carbon are provided to allow for switching the stream of organic solvent-guayule resin from one quantity of activated carbon to the other without interrupting the overall process.

As discussed in more detail below, the purification of the organic solvent-guayule resin stream or production of the purified organic solvent-guayule resin solution can be quantified in various ways, including, but not limited to, a reduction in the color intensity of the purified organic solvent-guayule resin solution as compared to the organic solvent-guayule resin stream of (a), a decrease in the amount of light (e.g., green light) reflected by the purified organic solvent-guayule resin solution as compared to the amount of such light reflected by the organic solvent-guayule resin stream, a decrease in the amount of light (e.g., red and/or blue light) absorbed by the purified organic solvent-guayule resin solution as compared to the amount of such light absorbed by the organic solvent-guayule resin stream, a decrease in the Hunter L darkness of the purified organic solvent-guayule resin solution as compared to the organic solvent-guayule resin stream. In certain preferred embodiments of the first-third embodiments, the organic solvent-guayule resin stream of (a) is green in color and the purified organic solvent-guayule resin solution has a green color than is less intense (or lighter) than the green of the organic solvent-guayule resin stream.

According to certain embodiments of the first-third embodiments, the step of contacting the organic solvent-guayule resin stream with activated carbon to produce a purified organic solvent-guayule resin solution functions to cause a majority by weight of the color bodies present in the organic solvent-guayule resin stream to be adsorbed to the activated carbon. In certain embodiments of the first-third embodiments, at least 55% by weight, at least 60% by weight, at least 65% by weight, at least 70% by weight, at least 75% by weight, at least 80% by weight, at least 85% by weight, at least 90% by weight, at least 90% by weight, at least 95% by weight, at least 98% by weight, or at least 99% by weight of color bodies present in the organic solvent-guayule resin stream is adsorbed to the activated carbon when the organic solvent-guayule resin stream is contacted with the activated carbon.

According to certain embodiments of the first-third embodiments, the step of contacting the organic solvent-guayule resin stream with activated carbon to produce a purified organic solvent-guayule resin solution functions to cause a majority by weight of any chlorophyll present in the organic solvent-guayule resin stream to be adsorbed to the activated carbon. In certain embodiments of the first-third embodiments, at least 55% by weight, at least 60% by weight, at least 65% by weight, at least 70% by weight, at least 75% by weight, at least 80% by weight, at least 85% by weight, at least 90% by weight, at least 90% by weight, at least 95% by weight, at least 98% by weight, or at least 99% by weight of any chlorophyll present in the organic solvent-guayule resin stream is adsorbed to the activated carbon when the organic solvent-guayule resin stream is contacted with the activated carbon.

According to certain embodiments of the first-third embodiments, the step of contacting the organic solvent-guayule resin stream with activated carbon to produce a purified organic solvent-guayule resin solution functions to cause a majority by weight of any lignins present in the organic solvent-guayule resin stream to be adsorbed to the activated carbon. In certain embodiments of the first-third embodiments, at least 55% by weight, at least 60% by weight, at least 65% by weight, at least 70% by weight, at least 75% by weight, at least 80% by weight, at least 85% by weight, at least 90% by weight, at least 90% by weight, at least 95% by weight, at least 98% by weight, or at least 99% by weight of any lignins present in the organic solvent-guayule resin stream is adsorbed to the activated carbon when the organic solvent-guayule resin stream is contacted with the activated carbon.

According to certain embodiments of the first-third embodiments, the step of contacting the organic solvent-guayule resin stream with activated carbon to produce a purified organic solvent-guayule resin solution functions to cause a majority by weight of any suberins present in the organic solvent-guayule resin stream to be adsorbed to the activated carbon. In certain embodiments of the first-third embodiments, at least 55% by weight, at least 60% by weight, at least 65% by weight, at least 70% by weight, at least 75% by weight, at least 80% by weight, at least 85% by weight, at least 90% by weight, at least 90% by weight, at least 95% by weight, at least 98% by weight, or at least 99% by weight of any suberins present in the organic solvent-guayule resin stream is adsorbed to the activated carbon when the organic solvent-guayule resin stream is contacted with the activated carbon.

According to certain embodiments of the first-third embodiments, the step of contacting the organic solvent-guayule resin stream with activated carbon to produce a purified organic solvent-guayule resin solution functions to cause a majority by weight of any tannins present in the organic solvent-guayule resin stream to be adsorbed to the activated carbon. In certain embodiments of the first-third embodiments, at least 55% by weight, at least 60% by weight, at least 65% by weight, at least 70% by weight, at least 75% by weight, at least 80% by weight, at least 85% by weight, at least 90% by weight, at least 90% by weight, at least 95% by weight, at least 98% by weight, or at least 99% by weight of any tannins present in the organic solvent-guayule resin stream is adsorbed to the activated carbon when the organic solvent-guayule resin stream is contacted with the activated carbon.

According to certain embodiments of the first-third embodiments, the step of contacting the organic solvent-guayule resin stream with activated carbon to produce a purified organic solvent-guayule resin solution meets at least one of the following: (a) functions to cause a majority by weight (including any of the specific amounts mentioned above) of any chlorophyll present in the organic solvent-guayule resin stream to be adsorbed to the activated carbon, (b) functions to cause a majority by weight (including any of the specific amounts mentioned above) of any lignins present in the organic solvent-guayule resin stream to be adsorbed to the activated carbon, (c) functions to cause a majority by weight (including any of the specific amounts mentioned above) of any suberins present in the organic solvent-guayule resin stream to be adsorbed to the activated carbon, or (d) functions to cause a majority by weight (including any of the specific amounts mentioned above) of any tannins present in the organic solvent-guayule resin stream to be adsorbed to the activated carbon. In certain embodiments of the first-third embodiments, each (i.e, all) of the foregoing (a)-(d) are met.

According to the processes of the first-third embodiments, the temperature of the organic solvent-guayule resin stream during contacting with the activated carbon (e.g., during the contacting of the first quantity of the organic solvent-guayule resin stream, the second quantity or any additional quantity) may vary. In certain embodiments of the first-third embodiments, the contacting meets condition (i) in that the organic solvent-guayule resin stream is at a temperature of 65 to 150° F. (e.g., 65, 70, 75, 80, 85, 90, 95, 100, 105, 110, 115, 120, 125, 130, 135, 140, 145, or 150° F.), preferably 100 to 120° F. (e.g., 100, 102, 104, 106, 108, 110, 112, 114, 116, 118, or 120° F.). In certain embodiments of the first-third embodiments, the organic solvent-guayule resin stream is at a temperature of 20 to 65° C. (e.g., 20, 25, 30, 35, 40, 45, 50, 55, 60 or 65° C.), preferably 35-50° C. (e.g., 35, 40, 45, or 50° C.). In certain embodiments of the first-third embodiments, the temperature of the regenerating solution during contacting with the isolated spent activated carbon is at a temperature of 65 to 150° F. (e.g., 65, 70, 75, 80, 85, 90, 95, 100, 105, 110, 115, 120, 125, 130, 135, 140, 145, or 150° F.), preferably 100 to 120° F. (e.g., 100, 102, 104, 106, 108, 110, 112, 114, 116, 118, or 120° F.). In certain embodiments of the first-third embodiments, the temperature of the regenerating solution during contacting with the isolated spent activated carbon stream is at a temperature of 20 to 65° C. (e.g., 20, 25, 30, 35, 40, 45, 50, 55, 60 or 65° C.), preferably 35-50° C. (e.g., 35, 40, 45, or 50° C.).

According to the processes of the first-third embodiments, the contacting of the organic solvent-guayule resin stream (e.g., the first quantity of the organic solvent-guayule resin stream, the second quantity or any additional quantity) with the activated carbon may take place at various pressures. In certain embodiments of the first-third embodiments, the contacting of the organic solvent-guayule resin stream with the activated carbon (e.g., the contacting of (b), the contacting of (e), or both) meets condition (ii) in that it takes place at a pressure of 1 to 3 atmospheres (e.g., 1, 1.2, 1.4, 1.5, 1.6, 1.8, 2, 2.2, 2.4, 2.5, 2.6, 2.8 or 3 atmospheres), preferably 1 to 1.5 atmospheres (e.g., 1, 1.1, 1.2, 1.3, 1.4, or 1.5 atmospheres).

According to the processes of the first-third embodiments, the contacting of the organic solvent-guayule resin stream (e.g., the first quantity of the organic solvent-guayule resin stream, the second quantity or any additional quantity) with the activated carbon may take place at various flow rates of the organic solvent-guayule resin stream through the activated carbon. In certain embodiments of the first-third embodiments, the contacting of the organic solvent-guayule resin stream with the activated carbon (e.g., the contacting of (b), the contacting of (e), or both) meets condition (iii) in that the flow rate of the organic solvent-guayule resins stream is at least 1 gallon per minute. In other embodiments of the first-third embodiments the flow rate is at least 5 gallons per minutes, at least 100 gallons per minute, at least 500 gallons per minute, at least 1000 gallons per minute, at least 2000 gallons per minute, at least 3000 gallons per minute, at least 4000 gallons per minute, at least 5000 gallons per minute, 1 to 100 gallons per minute, 100 to 5000 gallons per minute, or 500 to 5000 gallons per minute.

According to the processes of the first-third embodiments, the relative amount of the first quantity of organic solvent-guayule resin stream that is contacted with activated carbon may vary. The relative amounts of organic solvent-guayule resin stream and activated carbon may vary depending upon factors such as the concentration of color bodies in the organic solvent-guayule resin stream, the relative amount of color bodies sought to be removed from the organic solvent-guayule resin stream, the type of activated carbon, the amount of time allotted in the respective process for the contacting, the overall weight % of organic solvent(s) in the organic solvent-guayule resin stream, and the amount of agitation (if any) of the organic solvent-guayule resin stream with the activated carbon. Additionally, the relative amount of activated carbon may be higher when the color that is sought in the purified organic solvent-guayule resin solution is lighter (e.g., a higher Hunt L value) or less intense in color. Generally, according to the processes of the first-third embodiments, the higher the concentration of color bodies in the organic solvent-guayule resin stream, the more activated carbon and/or the longer the amount of time allotted in the respective process for the contacting. Generally, according to the processes of the first-third embodiments, the higher the relative amount of color bodies sought to be removed from the organic solvent-guayule resin stream, the more activated carbon and/or the longer the amount of time allotted in the respective process for the contacting. Generally, according to the processes of the first-third embodiments, the use of agitation during the contacting can reduce the amount of activated carbon used and/or reduce the amount of time allotted in the respective process for the contacting. While the processes of the first-third embodiments can be understood as removing color bodies from the organic solvent-guayule resin stream, it should be understood that all of the color bodies are not necessarily removed from the organic solvent-guayule resin stream. In other words, the processes of the first-third embodiments remove color bodies in that they reduce the amount of color bodies present, but the purified organic solvent-guayule resin stream that is produced may still contain some color bodies (although a lesser amount than the organic solvent-guayule resin stream prior to contacting with the activated carbon).

According to the first-third embodiments, the contacting of (b) (i.e., contacting a first quantity of the organic solvent-guayule resin stream of (a) with activated carbon to produce a purified organic solvent-guayule resin solution) may utilize various amount of activated carbon and organic solvent-guayule resin stream. In certain embodiments of the processes of the first-third embodiments, the contacting of (b) (i.e., contacting a first quantity of the organic solvent-guayule resin stream of (a) with activated carbon to produce a purified organic solvent-guayule resin solution) utilizes a weight ratio of organic solvent-guayule resin stream to activated carbon of no more than 30:1. In certain embodiments of the processes of the first-third embodiments, the contacting of (b) (i.e., contacting a first quantity of the organic solvent-guayule resin stream of (a) with activated carbon to produce a purified organic solvent-guayule resin solution) utilizes a weight ratio of organic solvent-guayule resin stream to activated carbon of 30:1 to 1:1 (e.g., 30:1, 25:1, 20:1, 15:1, 12:1, 10:1, 7:1, 5:1, 3:1, or 1:1), preferably 20:1 to 3:1 (e.g., 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, or 1:1). In certain embodiments of the first-third embodiments, the weight ratio of organic solvent-guayule resin stream to activated carbon may be less than 1:1 (e.g., more activated carbon is used by weight than organic solvent-guayule resin). In certain embodiments of the first-third embodiments, it may be preferred to use the least amount of activated carbon possible to achieve the desired purification in the allotted time due to the cost of the activated carbon.

In certain embodiments of the processes of the first-third embodiments, the contacting of (e) (i.e., contacting a second quantity of the organic solvent-guayule resin stream of (a) with activated carbon to produce a purified organic solvent-guayule resin solution) utilizes the same weight ratio of organic solvent-guayule resin stream to activated carbon as the contacting of (b), i.e., no more than 30:1. In certain embodiments of the processes of the first-third embodiments, the contacting of (e) (i.e., contacting a second quantity of the organic solvent-guayule resin stream of (a) with activated carbon to produce a purified organic solvent-guayule resin solution) utilizes a weight ratio of organic solvent-guayule resin stream to activated carbon of 30:1 to 1:1 (e.g., 30:1, 25:1, 20:1, 15:1, 12:1, 10:1, 7:1, 5:1, 3:1, or 1:1), preferably 20:1 to 3:1 (e.g., 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, or 1:1). In certain embodiments of the first-third embodiments, the weight ratio of organic solvent-guayule resin stream to activated carbon may be less than 1:1 (e.g., more activated carbon is used by weight than organic solvent-guayule resin) such as 0.9:1, 0.5:1, or less. In other embodiments of the processes of the first-third embodiments, the contacting of (e) utilizes a lower weight ratio of organic solvent-guayule resin stream to activated carbon than the contacting of (b) in order to account for the adsorption of color bodies that occurred during the contacting of the first quantity; in certain such embodiments, the contacting of (e) uses a weight ratio of organic solvent-guayule resin stream to activated carbon that is at least 10% less than the ratio used in the contacting of (b) (e.g., (b) uses a ratio of no more than 10:1 and (e) uses a ratio of no more than 9:1).

As mentioned above, in certain embodiments of the first-third embodiments, additional quantities of organic solvent-guayule resin stream are contacted with the activated carbon before it is considered to be spent activated carbon. According to such embodiments, the weight ratio of organic solvent-guayule resin stream to activated carbon will generally be no more than 30:1 or within one of the ranges discussed above for the first quantity, and in certain embodiments will be at least 10% than the weight ratio of the prior quantity of organic solvent-guayule resin stream to activated carbon to account for the prior adsorption of color bodies to the activated carbon.

According to the processes of the first-third embodiments, the type of activated carbon used to contact the organic solvent-guayule resin stream may vary. In certain embodiments of the first-third embodiments, the activated carbon is a powder having a particle size of less than 80 mesh (e.g., will pass through an 80 mesh screen, through a 100 mesh screen, through a 150 mesh screen, through a 200 mesh screen, through a 250 mesh screen, through a 300 mesh screen, through a 350 mesh screen, or smaller) or even less than 100 mesh. In other embodiments of the first-third embodiments, the activated carbon is granular, having an irregular size ranging from 0.2 to 5 mm (e.g., 0.2, 0.4, 0.5, 0.6, 0.8, 1, 1.5, 2, 2.5, 3, 3.5, 4, 4.5 or 5 mm), or from 0.5 to 3 mm (e.g., 0.5, 0.6, 0.8, 1, 1.5, 2, 2.5, or 3 mm). In yet other embodiments, the activated carbon is present in a fiber or cloth form. Exemplary cloth forms of activated carbon include FLEXZORB® cloth from Chemviron. According to the first-third embodiments, the activated carbon may be sourced from various materials, including, but not limited to coconut, coal and wood. In certain embodiments of the first-third embodiments, the activated carbon has an ash content of less than 10 weight % (e.g., 10, 9, 8, 7, 6, 5, 4, 3, 2, or 1 weight %), preferably less than 7 weight % (e.g., 7, 6, 5, 4, 3, 2, or 1 weight %), more preferably less than 5 weight % (e.g., 5, 4, 3, 2 or 1 weight %). In certain embodiments of the first-third embodiments, the activated carbon has a molasses decolorizing number of at least 200 (e.g., 200, 250, 300, 350, 400, 450, or more), preferably at least 400 (e.g., 400, 450, 500, 550, 600 or more).

According to the processes of the first-third embodiments, the activated carbon that is utilized to contact the first quantity of the organic solvent-guayule resin stream, the second quantity of the organic solvent-guayule resin stream, or additional quantities of the organic solvent-guayule resin stream may be present in various forms during the contact. In certain embodiments of the first-third embodiments, the activated carbon is present in a column. In other embodiments of the first-third embodiments, the activated carbon is present in a bed.

Isolating the Spent Activated Carbon

As discussed above, according to the processes of the first-third embodiments, the spent activated carbon of (b) is isolated from the purified organic solvent-guayule resin solution of (b). By isolating is meant that the solid spent activated carbon is separated from the liquid portion of the purified organic solvent-guayule resin solution. In certain embodiments of the processes of the first-third embodiments, at least 50% by weight of the liquid portion of the purified organic solvent-guayule resin solution is separated or isolated from the spent activated carbon, preferably at least 70% by weight, even more preferably at least 80% by weight or at least 90% by weight (e.g., 90%, 91%, 92%, 93%, 94%, 95%, 96%, 97%, 98%, 99%, or more). Isolation of the spent activated carbon from the purified organic solvent-guayule resin solution may take place by various methods including at least one of filtering, centrifuging, draining, screening, or gravity settling. In certain preferred embodiments of the first-third embodiments, the isolation comprises draining; in certain such embodiments the activated carbon is present in a bed. In certain embodiments of the first-third embodiments, gravity settling is followed by further purification of the supernatant by various methods including at least one of filtering, centrifuging, or screening to achieve more complete removal of the spent activated carbon.

Regenerating Solution and Contact Therewith

As mentioned above, the processes of the first and second embodiments include a step of contacting the isolated spent activated carbon with a regenerating solution in order to produce regenerated activated carbon. Use of this step removes the moieties that have been adsorbed to the spent activated carbon, thereby regenerating the activated carbon for further use. According to the processes of the first and second embodiments, the regenerating solution comprises a combination of polar organic and non-polar organic solvents. One or more than one (e.g., two, three, four, or more) polar organic solvent may be used in combination with one or more than one (e.g., two, three, four, or more) non-polar organic solvent.

In certain embodiments of the first and second embodiments, the regenerating solution comprises about 20 to about 50% by weight polar organic solvent(s) and about 50 to about 80% by weight non-polar organic solvent(s). The particular type of polar organic solvent(s) and non-polar organic solvents present in the regenerating solution may vary, as discussed in more detail below. In certain embodiments of the first and second embodiments, the regenerating solution comprises 20 to 50% (e.g., 20%, 25%, 30%, 35%, 40%, 45%, or 50%) by weight polar organic solvent(s) and 50 to 80% (e.g., 50%, 55%, 60%, 65%, 70%, 75%, or 80%) by weight non-polar organic solvent(s); 20 to 40% by weight polar organic solvent(s) and 60 to 80% by weight non-polar organic solvents; or 30 to 50% by weight polar organic solvent(s) and 50 to 70% by weight non-polar organic solvents. According to the first and second embodiments, the polar organic solvent(s) and non-polar organic solvent(s) that are used in the regenerating solution may be the same or different than the polar organic solvent(s) and non-polar organic solvent(s) that are present in the organic solvent-guayule resin stream. In those embodiments of the first and second embodiments wherein the polar and non-polar organic solvents of the regenerating solution are the same as the polar and non-polar organic solvents that are present in the organic solvent-guayule resin stream, a benefit is conferred in that residual solvents (i.e., the polar and non-polar organic solvents of the regenerating solution) remaining in regenerated activated carbon will not contaminate the organic solvent-guayule resin stream when the regenerated activated carbon is used with a new quantity of organic solvent-guayule resin stream to remove color bodies.

Generally, according to the first and second embodiments, the step of contacting the isolated spent activated carbon with a regenerating solution (i.e., step (d)) may utilize varying amounts of regenerating solution and spent activated carbon. In certain embodiments of the first and second embodiments, the step of contacting the isolated spent activated carbon with a regenerating solution utilizes a weight ratio of regenerating solution to isolated spent activated carbon of at least 1:1. In certain embodiments of the first and second embodiments, the step of contacting the isolated spent activated carbon with a regenerating solution utilizes a weight ratio of regenerating solution to isolated spent activated carbon of 30:1 to 1:1 (e.g., 30:1, 25:1, 20:1, 15:1, 10:1, 5:1, or 1:1), 20:1 to 1:1 (e.g., 20:1, 15:1, 10:1, 5:1, or 1:1), 10:1 to 1:1 (e.g., 10:1, 9:1, 8:1, 7:1, 6:1, 5:1, 4:1, 3:1, 2:1, or 1:1), preferably 3:1 to 1:1 (e.g., 3:1, 2.5:1, 2:1, 1.5:1, or 1:1).

Generally, according to the first and second embodiments, the step of contacting the isolated spent activated carbon with a regenerating solution includes mixing of the isolated spent activated carbon with a quantity of regenerating solution. In certain embodiments of the first and second embodiments, the mixing includes agitation of the combination of isolated spent activated carbon and regenerating solution. According to the first and second embodiments, the amount of time that the isolated spent activated carbon and regenerating solution are in contact may vary. In certain embodiments of the first and second embodiments, the isolated spent activated carbon and regenerating solution at in contact for at least 5 minutes. In certain embodiments of the first and second embodiments, the isolated spent activated carbon and regenerating solution at in contact for a period of time ranging from 5 minutes to 12 hours (e.g., 5 minutes, 10 minutes, 20 minutes, 30 minutes, 45 minutes, 1 hour, 2 hours, 3 hours, 4 hours, 5 hours, 6 hours, 7 hours, 8 hours, 9 hours, 10 hours, 11 hours, or 12 hours), preferably 5 minutes to 3 hours (e.g., 5 minutes, 10 minutes, 20 minutes, 30 minutes, 45 minutes, 1 hour, 2 hours, or 3 hours), even more preferably 5 minutes to 1 hour (e.g., 5 minutes, 10 minutes, 15 minutes, 20 minutes, 25 minutes, 30 minutes, 35 minutes, 40 minutes, 45 minutes, 50 minutes, 55 minutes, or 1 hour).

According to the first and second embodiments, the step of contacting the isolated spent activated carbon with a regenerating solution to produce regenerated activated carbon may take place at various temperatures. In certain embodiments of the first and second embodiments, the contacting of the isolated spent activated carbon with a regenerating solution takes place at a temperature of at least 5° F. less than the boiling point of the regenerating solution. In certain embodiments of the first and second embodiments, the contacting of the isolated spent activated carbon with a regenerating solution takes place at a temperature of 5° F. to 35° F. less (e.g., 5° F. less, 10° F. less, 15° F. less, 20° F. less, 25° F. less, 30° F. less, or 35° F. less) to than the boiling point of the regenerating solution. By maintaining the temperature below the boiling point of the regenerating solution, evaporation of the solvent from the mixture of isolated spent activated carbon and regenerating solution can be avoided.

In certain embodiments of the first and second embodiments, the step of contacting the isolated spent activated carbon with a regenerating solution to produce regenerated activated carbon is followed by a step of isolating the regenerated activated carbon from the regenerating solution. By isolating is meant that the solid regenerated activated carbon is separated from the regenerating solution. In certain embodiments of the processes of the first and second embodiments, at least 50% by weight of the regenerating solution is separated or isolated from the regenerated carbon, preferably at least 70% by weight, even more preferably at least 80% by weight or at least 90% by weight (e.g., 90%, 91%, 92%, 93%, 94%, 95%, 96%, 97%, 98%, 99%, or more). Isolation of the regenerated activated carbon from the regenerating solution may take place by various methods including at least one of filtering, centrifuging, draining, screening, or gravity settling. In certain embodiments of the first and second embodiments, gravity settling is followed by further purification of the supernatant (of the regenerating solution) by various methods including at least one of filtering, centrifuging, or screening to achieve more complete removal of the regenerated activated carbon. In certain embodiments of the first and second embodiments, the isolated regenerating solution may be re-used (e.g., by using it to contact at least one additional portion of spent activated carbon to produce regenerated activated carbon).

Organic Solvents

As mentioned above, according to the first-third embodiments, the organic solvent-guayule resin stream includes a solvent component which includes polar organic solvent and optionally non-polar organic solvent. As also mentioned above, according to the first and second embodiments, the regenerating solution which is used to contact the isolated spent activated carbon to produce regenerated activated carbon includes polar organic solvent and non-polar organic solvent. Generally, one or more than one polar organic solvent and one or more than one non-polar organic solvent may be utilized in (present in) the organic solvent-guayule resin stream and in the regenerating solution, and the same or different polar and non-polar organic solvents may be used in the organic solvent-guayule resin stream and in the regenerating solution.

In certain embodiments of the first-third embodiments, the organic solvent-guayule resin stream includes a polar organic solvent selected from the group consisting of alcohols having 1 to 8 carbon atoms (e.g., methanol, ethanol, propanol, butanol, propanol, pentanol, hexanol, heptanol, octanol); ethers and esters having from 2 to 8 carbon atoms; cyclic ethers having from 4 to 8 carbon atoms; and ketones having from 3 to 8 carbon atoms (e.g., acetone, butanone, 2-pentanone, 3-pentanone, hexanone, etc.); and combinations thereof. According to the first-third embodiments, one or more than one (e.g., two, three, four, or more) polar organic solvent may be used in the solvent component of the organic solvent-guayule resin stream. The alcohol may be linear (e.g., n-butanol) or branched (e.g., iso-butanol). The ether or ester may also be linear (e.g., diethyl ether or ethyl acetate) or branched (e.g., diisopropyl ether). In certain preferred embodiments of the first-third embodiments, the organic solvent-guayule resin stream includes a polar organic solvent selected from the group of alcohols having 1 to 8 carbon atoms, ketones having from 3 to 8 carbon atoms, and combinations thereof; or more preferably from alcohols having 1 to 4 carbon atoms, ketones having from 3 to 5 carbon atoms, or combinations thereof. In other preferred embodiments of the first-third embodiments, the organic solvent-guayule resin stream includes a polar organic solvent selected from ketones having 3 to 8 carbon atoms, and more preferably from ketones having 3 to 5 carbon atoms. In certain preferred embodiments of the first-third embodiments, the polar organic solvent of the organic solvent-guayule resin stream comprises acetone; in certain such embodiments, the polar organic solvent of the organic solvent-guayule resin stream is limited to acetone (i.e., the polar organic solvent of the organic solvent-guayule resin stream consists (only) of acetone). In certain embodiments of the first-third embodiments, the polar organic solvent of the organic solvent-guayule resin stream is selected from one of the foregoing described groups and is used in combination with a non-polar organic solvent selected from one of the groups described in the following paragraph.

In certain embodiments of the first-third embodiments, the organic solvent-guayule resin stream includes a non-polar organic solvent selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms; and combinations thereof. According to the first-third embodiments, one or more than one (e.g., two, three, four, or more) non-polar organic solvent may be used in the solvent component of the organic solvent-guayule resin stream. The alkane may be linear (e.g., n-butane, n-hexane, n-heptane, n-octane, n-nonane), branched (e.g., iso-butane, iso-hexane, iso-heptane, iso-octane, or iso-nonane), or a combination thereof. In certain preferred embodiments of the first-third embodiments, the organic solvent-guayule resin stream includes a non-polar organic solvent selected from the group of alkanes (linear, branched, or a combination thereof) having 4 to 9 carbon atoms, more preferably from the group of alkanes (linear, branched, or a combination thereof) having 4 to 6 carbon atoms. In certain preferred embodiments of the first-third embodiments, the non-polar organic solvent of the organic solvent-guayule resin stream comprises an alkane having 6 carbon atoms (e.g., hexane, iso-hexane, or a combination thereof); in certain such embodiments, the non-polar organic solvent of the organic solvent-guayule resin stream is limited to an alkane having 6 carbon atoms (i.e., the non-polar organic solvent of the organic solvent-guayule resin stream consists (only) of an alkane having 6 carbon atoms). In certain embodiments of the first-third embodiments, the non-polar organic solvent of the organic solvent-guayule resin stream is selected from one of the foregoing described groups and is used in combination with a polar organic solvent selected from one of the groups described in the preceding paragraph.

In certain embodiments of the first and second embodiments, the polar organic solvent of the regenerating solution is selected from the group consisting of alcohols having 1 to 8 carbon atoms (e.g., methanol, ethanol, propanol, butanol, propanol, pentanol, hexanol, heptanol, octanol); ethers and esters having from 2 to 8 carbon atoms; cyclic ethers having from 4 to 8 carbon atoms; and ketones having from 3 to 8 carbon atoms (e.g., acetone, butanone, 2-pentanone, 3-pentanone, hexanone, etc.); and combinations thereof. According to the first and second embodiments, one or more than one (e.g., two, three, four, or more) polar organic solvent may be used in the regenerating solution. The alcohol may be linear (e.g., n-butanol) or branched (e.g., iso-butanol). The ether or ester may also be linear (e.g., diethyl ether or ethyl acetate) or branched (e.g., diisopropyl ether). In certain preferred embodiments of the first and second embodiments, the regenerating solution includes a polar organic solvent selected from the group of alcohols having 1 to 8 carbon atoms, ketones having from 3 to 8 carbon atoms, and combinations thereof; or more preferably from alcohols having 1 to 4 carbon atoms, ketones having from 3 to 5 carbon atoms, or combinations thereof. In other preferred embodiments of the first and second embodiments, the regenerating solution includes a polar organic solvent selected from ketones having 3 to 8 carbon atoms, and more preferably from ketones having 3 to 5 carbon atoms. In certain preferred embodiments of the first and second embodiments, the polar organic solvent of the organic solvent-guayule resin stream comprises acetone; in certain such embodiments, the polar organic solvent of the organic solvent-guayule resin stream is limited to acetone (i.e., the polar organic solvent of the organic solvent-guayule resin stream consists (only) of acetone). In certain embodiments of the first and second embodiments, the polar organic solvent of the regenerating solution is selected from one of the foregoing described groups and is used in combination with a non-polar organic solvent selected from one of the groups described in the following paragraph.

In certain embodiments of the first and second embodiments, the regenerating solution includes a non-polar organic solvent selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms; and combinations thereof. According to the first and second embodiments, one or more than one (e.g., two, three, four, or more) non-polar organic solvent may be used in the regenerating solution. The alkane may be linear (e.g., n-butane, n-hexane, n-heptane, n-octane, n-nonane), branched (e.g., iso-butane, iso-hexane, iso-heptane, iso-octane, or iso-nonane), or a combination thereof. In certain preferred embodiments of the first and second embodiments, the regenerating solution includes a non-polar organic solvent selected from the group of alkanes (linear, branched, or a combination thereof) having 4 to 9 carbon atoms, more preferably from the group of alkanes (linear, branched, or a combination thereof) having 4 to 6 carbon atoms. In certain preferred embodiments of the first and second embodiments, the non-polar organic solvent of the regenerating solution comprises an alkane having 6 carbon atoms (e.g., hexane, iso-hexane, or a combination thereof); in certain such embodiments, the non-polar organic solvent of the regenerating solution is limited to an alkane having 6 carbon atoms (i.e., the non-polar organic solvent of the regenerating solution consists (only) of an alkane having 6 carbon atoms). In certain embodiments of the first and second embodiments, the non-polar organic solvent of the regenerating solution is selected from one of the foregoing described groups and is used in combination with a polar organic solvent selected from one of the groups described in the preceding paragraph.

Removal Of Color Bodies

As mentioned above, the purification of the organic solvent-guayule resin stream or production of the purified organic solvent-guayule resin solution can be quantified in various ways, including, but not limited to, a reduction in the color intensity of the organic solvent-guayule resin stream of (a), a decrease in the amount of light (e.g., green light) reflected by the organic solvent-guayule resin stream, a decrease in the amount of light (e.g., red and/or blue light) absorbed by the organic solvent-guayule resin stream, or a decrease in the Hunter L darkness. According to certain embodiments of the first-third embodiments, the organic solvent-guayule resin stream may be green or yellow in color (due to the presence of the color bodies) when it is initially contacted with the activated carbon and will lighten in color as the activated carbon adsorbs the color bodies. The purified organic solvent-guayule resin solution will generally either have a lighter green color (i.e., less intense green) or a lighter yellow color (i.e., less intense yellow) than the non-purified organic solvent-guayule resin stream or will be almost clear or only slightly yellow (or slightly green).

A reduction in the color intensity of the organic solvent-guayule resin stream after contact with activated carbon can be measured or quantified by various methods which can involve for example preparing a calibration curve correlating amounts of added chlorophyll (optionally in combination with other added color bodies such as lignins, suberins, and tannins) to the resulting color of the stream using a spectroradiometer or colorimeter. A baseline for a sample of the stream considered to contain no color bodies can be prepared by mixing a 25 gram sample of the stream with activated carbon in a weight ratio of 2:1 (i.e., 2 parts stream to 1 part activated carbon) and allowing the two to remain in contact for 24 hours at room temperature. Known quantities of color bodies (e.g., chlorophyll) can then be added to aliquots of this baseline stream to prepare the calibration curve. Once a calibration curve has been prepared, the weight % color bodies that have been removed by contacting with activated carbon can be determined by comparing the pre-purified stream (i.e., the organic solvent-guayule resin stream) to the purified organic solvent-guayule resin solution. Using a similar procedure, purification of the organic solvent-guayule resin stream can also be measured based upon a decrease in the amount of red and/or blue light absorbed by the purified organic solvent-guayule resin solution as compared to the unpurified organic solvent-guayule resin solution making use of the Beer-Lambert Law and taking into account that chlorophyll-a and chlorophyll-b have different maximum absorbances for red and blue light. Similarly, purification of the organic solvent-guayule resin stream can also be measured based upon a decrease in the amount of green light reflected by the purified organic solvent-guayule resin solution as compared to the unpurified organic solvent-guayule resin solution making use of the Beer-Lambert Law and taking into account that chlorophyll-a and chlorophyll-b have different maximum absorbances for green light.

Purification of the organic solvent-guayule resin stream by removal of color bodies can also be measured according to the decrease in the Hunter L darkness value for the purified organic solvent-guayule resin solution as compared to the unpurified organic solvent-guayule resin stream. Hunter L values provide a measure of darkness with L values ranging from 100 (white) to 0 (black). In certain embodiments of the first-third embodiments, contacting of the organic solvent-guayule resin stream with activated carbon results in a purified organic solvent-guayule resin solution having an increased Hunter L value that is at least 5 units (e.g., 5, 10, 15, 20, 25, 30, 35, 40 or more) higher than, preferably at least 10 units (e.g., 10, 15, 20, 25, 30, 35, 40, 45 or 50 or more) higher than the Hunter L value of the unpurified organic solvent-guayule resin stream. In certain embodiments of the first-third embodiments, the unpurified organic solvent-guayule resin stream has a Hunter L darkness of 40-60 (e.g., 40, 42, 44, 46, 48, 50, 52, 54, 56, 58, or 60). In certain embodiments of the first-third embodiments, the purified organic solvent-guayule resin solution has a Hunter L darkness of 51-80 (e.g., 51, 53, 55, 57, 59, 61, 63, 65, 67, 69, 71, 73, 75, 77, 79, or 80).

Processes of the Third Embodiment

As discussed above, in a third embodiment, a process is disclosed for removing color bodies from an organic solution comprising guayule resin. According to the third embodiment, the process comprises (a) providing an organic solvent-guayule resin stream comprising (i) at least 0.3 weight % guayule resin based upon the total weight of the organic solvent-guayule resin stream, and (ii) polar organic solvent in an amount of about 15 to about 65 weight % based upon the total weight of the organic solvent-guayule resin stream; (b) contacting a first quantity of the organic solvent-guayule resin stream of (a) with activated carbon and producing a purified organic solvent-guayule resin solution and spent activated carbon; and (c) isolating the spent activated carbon from the purified organic solvent-guayule resin solution of (b). The foregoing described process can be considered to be clause 1.

At least the following variations upon the third embodiment as set forth in clause 1 are specifically contemplated.

Clause 2: The process of clause 1, wherein the contacting of (b) utilizes a weight ratio of organic solvent-guayule resin stream to activated carbon of no more than 30:1, preferably 30:1 to 1:1, more preferably 20:1 to 3:1.

Clause 3: The process of clause 1 or clause 2, wherein the activated carbon of (b) is present in a column.

Clause 4: The process of clause 1 or clause 2, wherein the activated carbon of (b) is present in a bed.

Clause 5: The process of any one of clauses 1-4, wherein the isolating of (c) comprises at least one of filtering, centrifuging, draining, screening, or gravity settling.

Clause 6: The process of any one of clauses 1-5, wherein the organic solvent-guayule resin stream of (a) has a Hunter L darkness of 40-60.

Clause 7: The process of any one of clauses 1-6, wherein the purified organic solvent-guayule resin solution of (b) has a Hunter L darkness of 51-80.

Clause 8: The process of any one of clauses 1-7, wherein the purified organic solvent-guayule resin solution of (b) has a Hunter L darkness at least 5 units, preferably at least 10 units higher than the Hunter L darkness of the organic solvent-guayule resin stream of (a).

Clause 9: The process of any one of clauses 1-8, wherein the contacting of (b) meets at least one of the following conditions:
  i. the organic solvent-guayule resin stream of (a) is at a temperature of 65 to 150° F., preferably 100 to 120° F. during the contacting of (b),
  ii. the contacting of (b) takes places at a pressure of 1 to 3 atmospheres, preferably 1 to 1.5 atmospheres,
  iii. the contacting of (b) has a flow rate of at least 5 gallons/minute of organic solvent-guayule resin stream through the activated carbon,
  iv. a majority by weight of any chlorophyll present in the organic solvent-guayule resin stream of (a) is adsorbed to the activated carbon,
  v. a majority by weight of any lignins present in the organic solvent-guayule resin stream of (a) are adsorbed to the activated carbon,
  vi. a majority by weight of any suberins present in the organic solvent-guayule resin stream of (a) are adsorbed to the activated carbon, or
  vii. a majority by weight of any tannins present in the organic solvent-guayule resin stream of (a) are adsorbed to the activated carbon.

Clause 11: The process of clause 10, wherein each of (i)-(vii) are met.

Clause 12: The process of any one of clauses 1-11, wherein the organic solvent-guayule resin stream of (a) contains no more than 10%, preferably no more than 5%, even more preferably no more than 2% by weight of water based upon the total weight of the organic solvent-guayule resin stream.

Clause 13: The process of any one of clauses 1-12, wherein the polar organic solvent of the organic solvent-guayule resin stream of (a) is selected from the group consisting of alcohols having 1 to 8 carbon atoms; ethers and esters having from 2 to 8 carbon atoms; cyclic ethers having from 4 to 8 carbon atoms; and ketones having from 3 to 8 carbon atoms; and combinations thereof.

Clause 14: The process of any one of clauses 1-13, wherein the organic solvent-guayule resin stream of (a) includes a non-polar organic solvent selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms; and combinations thereof.

Clause 15: The process of any one of clauses 1-14, wherein the organic solvent-guayule resin stream of (a) includes about 15 to about 80 weight % of at least one polar organic solvent, preferably about 45 to about 80 weight % of at least one polar organic solvent, based upon the total weight of the organic solvent-guayule resin stream.

Clause 16: The process of any one of clauses 1-15, wherein the organic solvent-guayule resin stream of (a) includes about 10 to about 85 weight % of at least one non-polar organic solvent, preferably about 10 to about 50 weight % of at least one non-polar organic solvent, based upon the total weight of the organic solvent-guayule resin stream.

Clause 17: The process of clause 16, wherein the amount of polar solvent in the organic solvent-guayule resin stream is greater than the amount of non-polar organic solvent in the organic solvent-guayule resin stream.

Clause 18: The process of any one of clauses 1-17, wherein the amount of water present in the organic solvent-guayule resin stream is no more than 10 weight %, preferably no more than 5 weight %, based upon the total weight of the organic solvent-guayule resin stream.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A process for removing color bodies from an organic solution comprising guayule resin comprising
   a. providing an organic solvent-guayule resin stream comprising (i) at least 0.3 weight % guayule resin, based upon the total weight of the organic solvent-guayule resin stream, and either (ii) polar organic solvent in an amount of about 15 to about 80 weight % based upon the total weight of the organic solvent-guayule resin stream or (iii) polar organic solvent in an amount of about 45 to about 80 weight % based upon the total weight of the organic solvent-guayule resin stream, wherein the organic solvent-guayule resin stream includes no more than 1 weight % guayule rubber based upon the total weight of the organic solvent-guayule resin stream;
   b. contacting the organic solvent-guayule resin stream of (a) with activated carbon and producing a purified organic solvent-guayule resin solution and spent activated carbon;
   c. isolating the spent activated carbon from the purified organic solvent-guayule resin solution of (b); and
   d. contacting the isolated spent activated carbon from (c) with a regenerating solution comprising about 20 to about 50% by weight polar organic solvent and about 50 to about 80% non-polar organic solvent, thereby producing regenerated activated carbon.

2. The process of claim 1, wherein the contacting of (b) utilizes a weight ratio of organic solvent-guayule resin stream to activated carbon of no more than 30:1.

3. The process of claim 1, further comprising,
   e. using the regenerated activated carbon to contact a new quantity of organic solvent-guayule solvent-guayule resin stream to remove color bodies.

4. The process of claim 3, wherein the contacting of (e) utilizes a weight ratio of organic solvent-guayule resin stream to activated carbon of no more than 30:1.

5. The process of claim 1, wherein the contacting of (d) takes place at a temperature of at least 5° F. less than the boiling point of the regenerating solution.

6. The process of claim 1, wherein the contacting of (d) utilizes a weight ratio of regenerating solution to isolated spent activated carbon of 10:1 to 1:1.

7. The process of claim 1, wherein
   the polar organic solvent of the regenerating solution of (d) is selected from the group consisting of alcohols having 1 to 8 carbon atoms; ethers or esters each having from 2 to 8 carbon atoms; cyclic ethers having from 4 to 8 carbon atoms; ketones having from 3 to 8 carbon atoms; and combinations thereof; and
   the non-polar organic solvent of the regenerating solution of (d) is selected from the group consisting of alkanes having from 4 to 9 carbon atoms; cycloalkanes or alkyl cycloalkanes each having from 5 to 10 carbon atoms; aromatics or alkyl substituted aromatics each having from 6 to 12 carbon atoms; and combinations thereof.

8. A process for removing color bodies from an organic solution comprising guayule resin comprising
   a. providing an organic solvent-guayule resin stream comprising (i) at least 0.3 weight % guayule resin, based upon the total weight of the organic solvent-guayule resin stream, and (ii) polar organic solvent in an amount of about 15 to about 80 weight % based upon the total weight of the organic solvent-guayule resin stream;
   b. contacting the organic solvent-guayule resin stream of (a) with activated carbon and producing a purified organic solvent-guayule resin solution and spent activated carbon; and
   c. isolating the spent activated carbon from the purified organic solvent-guayule resin solution of (b).

9. The process of claim 8, wherein the contacting of (b) utilizes a weight ratio of organic solvent-guayule resin stream to activated carbon of no more than 30:1.

10. The process of claim 8, wherein the activated carbon of (b) is present in a column.

11. The process of claim 8, wherein the activated carbon of (b) is present in a bed.

12. The process of claim 8, wherein the isolating of (c) comprises at least one of filtering, centrifuging, draining, screening, or gravity settling.

13. The process of claim 8, wherein the organic solvent-guayule resin stream of (a) has a Hunter L darkness of 40-60.

14. The process of claim 8, wherein the purified organic solvent-guayule resin solution of (b) has a Hunter L darkness of 51-80.

15. The process of claim 8, wherein the purified organic solvent-guayule resin solution of (b) has a Hunter L darkness at least 5 units higher than the Hunter L darkness of the organic solvent-guayule resin stream of (a).

16. The process of claim 8, wherein the contacting of (b) meets at least one of the following conditions:
   i. the organic solvent-guayule resin stream of (a) is at a temperature of 65 to 150° F. during the contacting of (b),
   ii. the contacting of (b) takes places at a pressure of 1 to 3 atmospheres, iii. the contacting of (b) has a flow rate of at least 5 gallons/minute of organic solvent-guayule resin stream through the activated carbon,
iv. a majority by weight of any chlorophyll present in the organic solvent-guayule resin stream of (a) is adsorbed to the activated carbon,
v. a majority by weight of any lignins present in the organic solvent-guayule resin stream of (a) are adsorbed to the activated carbon,
vi. a majority by weight of any suberins present in the organic solvent-guayule resin stream of (a) are adsorbed to the activated carbon, or
vii. a majority by weight of any tannins present in the organic solvent-guayule resin stream of (a) are adsorbed to the activated carbon,
wherein the majority by weight in (iv)-(vii) refers to more than 50% by weight.

17. The process of claim 8, wherein the organic solvent-guayule resin stream of (a) contains no more than 10% by weight of water based upon the total weight of the organic solvent-guayule resin stream.

18. The process of claim 8, wherein the polar organic solvent of the organic solvent-guayule resin stream of (a) is selected from the group consisting of alcohols having 1 to 8 carbon atoms; ethers or esters each having from 2 to 8 carbon atoms; cyclic ethers having from 4 to 8 carbon atoms; ketones having from 3 to 8 carbon atoms; and combinations thereof.

19. The process of claim 8, wherein the organic solvent-guayule resin stream of (a) includes a non-polar organic solvent selected from the group consisting of alkanes having from 4 to 9 carbon atoms; cycloalkanes or alkyl cycloalkanes each having from 5 to 10 carbon atoms; aromatics or alkyl substituted aromatics each having from 6 to 12 carbon atoms; and combinations thereof.

20. The process of claim 16, wherein each of (i)-(vii) are met.

* * * * *